DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1324

T883,029

PROCESS FOR IMPROVING THE DIMENSIONAL STABILITY OF PNEUMACEL FIBERS

Donald W. Selby, Wilmington, Del., assignor to E. I. du Pont de Nemours and Company, Wilmington, Del., a corporation of Delaware

Filed June 4, 1970, Ser. No. 43,551

Int. Cl. D04h *3/08, 3/12*

U.S. Cl. 156—180

No Drawing. 18 Pages Specification

A process for preparing a dimensionally stable compressed batt of inflated polyester pneumacel staple fibers by making an uncompressed batt of the fibers, compressing the uncompressed batt at a specific heat setting temperature for a specified time and cooling the compressed batt while maintaining compression. The polyester can be polyethylene terephthalate. If desired, the batt may be treated with an adhesive binder prior to compressing.

The process stabilizes the compressed batt and reduces its tendency to expand, or grow, back toward its original uncompressed volume, especially when subjected to heat.